Patented Jan. 9, 1951

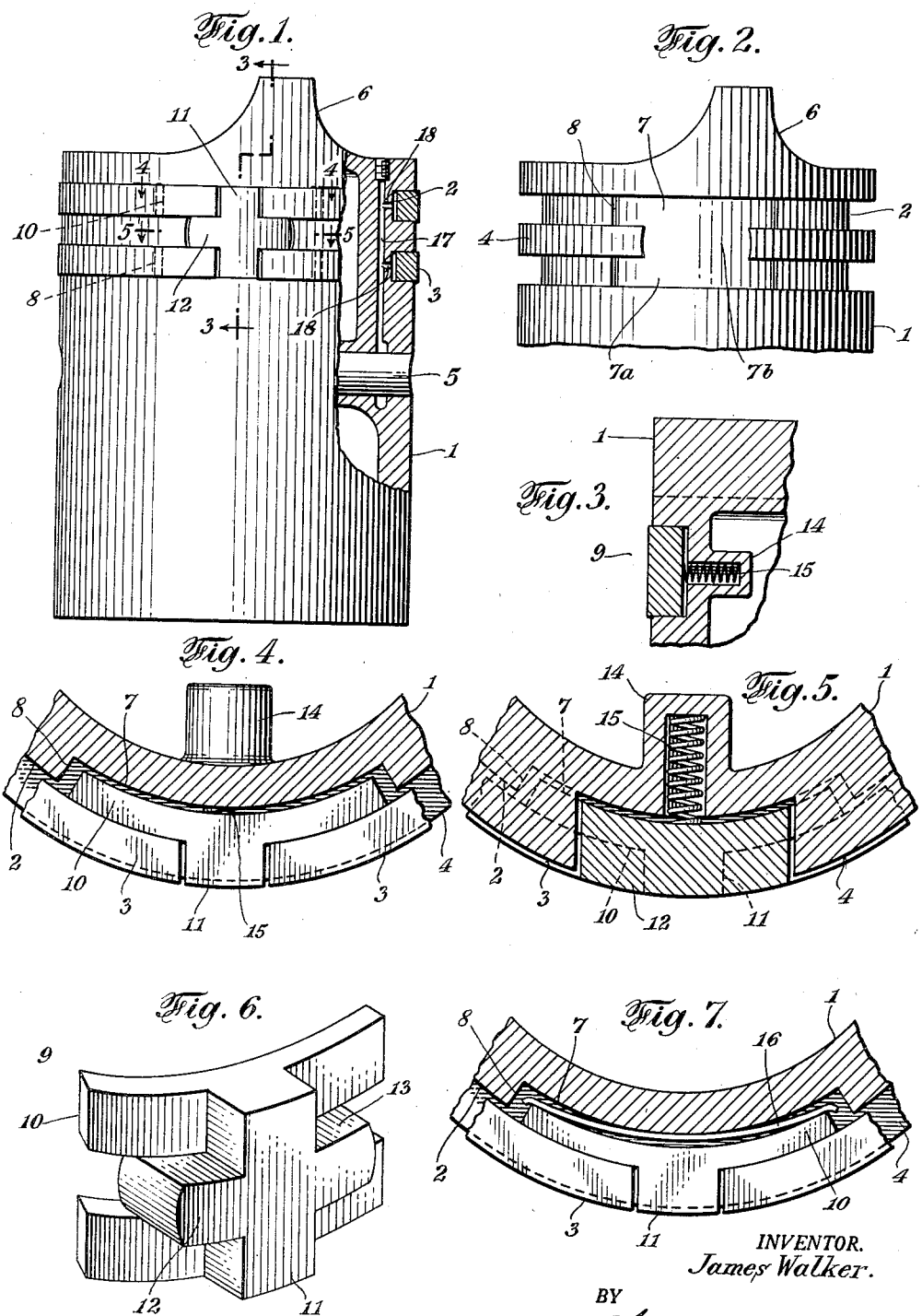
Jan. 9, 1951          J. WALKER          2,537,721
SEALING MEMBER FOR PISTON RINGS
Filed June 8, 1948
INVENTOR.
James Walker.
BY
William F. Arckel
ATTORNEY.

2,537,721

UNITED STATES PATENT OFFICE 2,537,721

SEALING MEMBER FOR PISTON RINGS

James Walker, Brooklyn, N. Y.; Jessie Walker administrator of said James Walker, deceased Application June 8, 1948, Serial No. 31,730

1 Claim. (Cl. 309—47)

My invention is an improvement in sealing devices for the rings carried by movable pistons, for producing a closer fit between the piston and the cylinder within which it travels, and particularly a sealing device for the piston rings of internal combustion engines.

An important object of the invention is to provide a sealing member that will effectually prevent the rings from rotating on the pistons, particularly in two cycle engines or other types of engines or cylinders having open ports past which the piston must travel; but said member is adaptable to any type of piston on any type engine fitted with rings in one piece. It is made of suitable metal having as nearly as possible the same coefficient of expansion as the piston on which it is to be installed.

Another object is to provide a sealing member of such design that it fully closes the space between the ends of the rings from within; that is on the inside face of the ring adjacent the bottom of the groove containing it; and further completely stops up the space between the ends of the rings and usually opening through the outer curved faces of same.

The joint between the member and the ring is therefore most effective in preventing blow-by, and prolongs the useful life of the piston rings, which are left free to expand while the member remains in operative position. The entrance and lodgment of carbon under the rings and the expansion of the rings and greater friction and wear are avoided entirely.

The sealing member herein set forth is best suited to pistons with two grooves or any multiple thereof and having rings in one piece fitted into individual grooves on the pistons, but said member may also be shaped for one ring in its groove at any predetermined position.

Piston rings of standard size are used, preferably with straight or square joints at the ends. The clearance at the ends is increased approximately the width of the ring, with the usual addition to allow for expansion when installed.

A further object is to provide a sealing member subjected to force exerted from the inner side thereof and of the ring; said force being about equal to the pressure of the ring against the inside of the surface of the cylinder. This force serves the double purpose of creating friction upon the ring and keeping the ring in firm contact with the cylinder wall at the same time. Hence the action of the sealing member is most efficient.

The invention is fully described in the ensuing description, and the novel features are pointed out in the claim. But the construction illustrated presents only the preferred embodiment of my invention and numerous changes in details can be made without departure from the essential design thereof.

Figure 1 is a side elevation, partly in section, of the piston of an internal combustion engine, bearing rings and a seal according to my invention.

Figure 2 is a side elevation of part of the piston of Figure 1 with the seal and rings removed.

Figure 3 is a vertical section on the line 3—3 of Figure 1.

Figure 4 is a section on the line 4—4 of Figure 1.

Figure 6 is a perspective view of the seal for the ends of the piston rings; and Figure 7 is a sectional view similar to Figure 4 presenting a modification.

The piston is indicated at 1, with two encircling grooves 2 for piston rings 3 adjacent the top. Between the grooves 2 the unreduced portion of the piston constitutes a rib 4 between the rings. At 5 is a transverse bore in the piston for a pin that unites it to the piston rod, not shown, that connects the piston to the crankshaft. The piston is illustrated as a piston for a two-cycle engine, with a projection 6 at the top to deflect the incoming charge from the inlet port in the side of the cylinder containing the piston towards the inner end of the cylinder; but the invention can also be used with rings for the pistons of four cycle engines, if desired.

The rings 3 are seated in the grooves 4, with the opposed separated ends of the rings in close proximity. The extremities of the rings are preferably square, but may be bevelled or have other forms and arrangements. In my invention the ends of the rings are of such extent that the opposed ends are separated by a slight gap, and this gap is entirely closed by the sealing member, which also causes the rings to fit the bore of the cylinder snugly, maintains the rings in the most effective operative positions. To this end the piston is shaped to have a recess 7, which is somewhat deeper than the grooves 4 and embraces parts of both grooves, crossing the rib 4 between them. The part of the recess which extends into the bottoms of the grooves is illustrated at 7a in Figure 2, and the portion of the recess that extends across the rib is shown at 7b. The size of the recess, measured circumferentially of the piston is several times as long as the interval between the ends of the rings 3. The sides of the recess make shoulders 8 in the adjacent grooves 2.

This recess constitutes a seat for the sealing member 9, which comprises a pair of comparatively thin, flat arms 10, curved in the same direction, of such length that they can be fitted into the portions 7a of the seat 7 in line with the grooves 4. These arms are joined on their convex faces at their centers by an integral projection 11. All parts of this projection 11 extend out from the arms far enough to be about equal to the thickness or depth of the rings 3 between the curved faces of the rings. The ends of the arms 10 are separated, and between them are the lateral projections 12, protruding from both sides of the bar 11, and flush with the outer face of the latter. The bar 11 serves as a bridge connecting the arms 10 and the ends of the bar and the parts or projections 12 of the sealing member, at the corners where they join the bar 11, offer seats 13, having faces extending both across the ends of the rings and parallel to one flat face thereof; said faces and the side faces of the bar 11 being substantially perpendicular to the convex faces of the arms 10; and when the member is disposed in the recess 7, the two projections 12 register with the adjacent ends of the rib 4. The parts 11 and 12 are flush with the outer faces of the rings 3. The parts 13 are also joined to each of the arms 10 along part of one edge of the latter.

The outer faces of the arms 10 are of such curvature that they make contact with the adjacent inner faces of the rings 3 throughout the lengths of the arms 10. The opposite faces of the arms 10 are concave. The inside of the piston 1 has a hollow boss 14, containing a coiled spiral spring 15, to press outward. The engagement of the member 9 with the adjacent ends of the rings 3 is thus maintained and the liability of any leakage between the rings and the arms 10 is eliminated. The parts 12 also present the passage of gas or oil between the opposed ends of the rings. Figure 7 shows a flat curved spring 16 which may be utilized in place of the spiral spring 15, the spring 16 being laid in the bottom of the recess 7.

The piston 1 has special oil drain ducts 17 between the top of the piston and the bore 5. These ducts are open along their sides within the bottom of the ring grooves 4, communicating with the grooves through ports 18.

The piston rings can be of the depth shown in the drawings or cut deeper all around the piston, so that they will take the sealing member without requiring a recess or seat 7. In that case, the rings are engaged by undulating or corrugated leaf springs which go all the way round the piston from one end of the sealing member to the other.

My sealing member can of course be employed with rings for any pistons, whether in internal combustion engines, steam engines or other motors and in pumps as well.

The purpose of the ducts 17 is to relieve excess oil pressure under the rings, and conduct the oil to the bore 5. The ends of the ducts at the inner end of the piston are of course plugged.

Having thus described my invention, what I claim as new and desire to secure by Letters Patent is:

A sealing member for piston rings comprising a pair of comparatively thin, parallel arms curved in the same direction and having relatively wide convex and concave faces, a transverse bridge connecting the convex faces of said arms, and overlying the full width of said faces, said bridge having approximately the same thickness as said rings, the member having projections at each side of the bridge between said arms, said projections also being of approximately the same thickness as said rings, the bridge and projections having intersecting surfaces substantially perpendicular to the convex faces of said arms, to present seats for the ends of said rings, said projections also being joined to each arm along the adjacent edges thereof.

JAMES WALKER.

REFERENCES CITED

The following references are of record in the file of this patent:

UNITED STATES PATENTS

| Number | Name | Date |
| --- | --- | --- |
| 407,370 | Peacock | July 23, 1889 |
| 743,645 | Kelsey | Nov. 10, 1903 |
| 1,601,237 | Carman | Sept. 28, 1926 |